March 11, 1969 E. C. CASTOR, SR Re. 26,544

CUTTING TOOL

Original Filed March 6, 1961

INVENTOR.
EDWIN C. CASTOR, SR.
BY
WILSON, SETTLE & CRAIG
ATTORNEYS

United States Patent Office

Re. 26,544
Reissued Mar. 11, 1969

26,544
CUTTING TOOL

Edwin C. Castor, Sr., 12768 Argyle,
Southgate, Mich. 48192

Original No. 3,117,366, dated Jan. 14, 1964, Ser. No. 93,376, Mar. 6, 1961. Application for reissue Mar. 28, 1968, Ser. No. 719,789
U.S. Cl. 29—103 1 Claim
Int. Cl. B26d *1/36*

Matter enclosed in heavy brackets [ ] appears in the original patent but forms no part of this reissue specification; matter printed in italics indicates the additions made by reissue.

*ABSTRACT OF THE DISCLOSURE*

*A cutting tool which has a plurality of parallel helical flutes defining cutting teeth on the surface of the tool. The tool further includes a helical groove of the opposite hand and of shorter lead to define spaced chip-breaking grooves in each of the helical flutes.*

The present invention relates to a rotary metal cutting tool, and more particularly to a rotary cutting tool in which the cutting teeth are formed with an improved chip-breaking groove construction.

It has been known heretofore that the provision of chip-breaking grooves in the cutting edges of metal cutting tools will improve the operation of the tool. The chip-breaking construction embodied in the present invention is directed towards improving the operating characteristics of such tools. The present design permits rapid stock removal with a minimum of chatter or vibration and also low heat built-up the tool to result in increased tool life and reduced wear on the machine in which the tool is mounted.

It is an object of the invention to provide a rotary metal cutting tool having chip-breaking grooves in the cutting teeth.

Another object of the invention is to provide chip-breaking grooves having a novel configuration which results in uniform chip-breaking to balance the cutting tool and permit operation of the tool with low power consumption.

A further object of the invention is to provide chip-breaking grooves in the cutting teeth of the tool which form individual teeth-portions on the cutting teeth, each of such portions having a configuration which results in improved chip-breaking.

Another object of the invention is to provide a cutting tool in which the cutting teeth are formed by helical flutes and the chip-breaking grooves are formed by a continuous helical groove of the opposite hand from the flutes to provide an efficient chip-breaking action.

Other objects of this invention will appear in the following description and appended claim, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
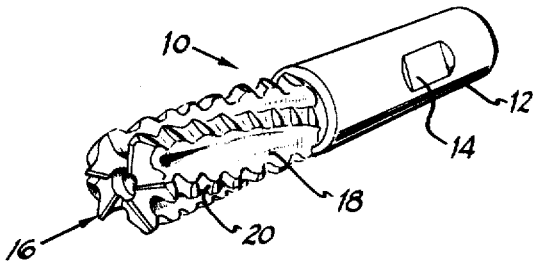
FIGURE 1 is a view in perspective of one embodiment of the cutting tool of the present invention.
Figure 2:
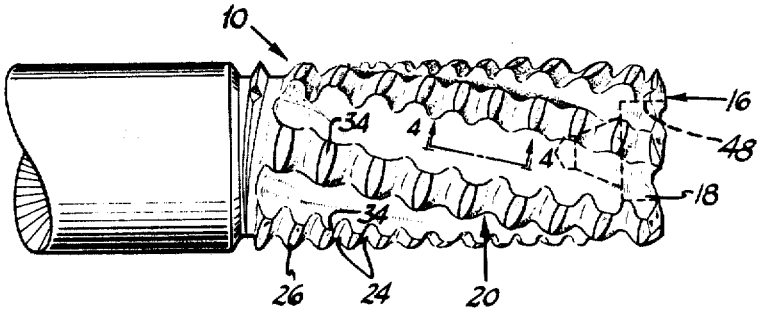
FIGURE 2 is a side elevational view of the cutting tooth portion of the FIGURE 1 tool.

FIGURE 1 illustrates one embodiment of the rotary cutting tool of the invention. The tool 10 is particularly adapted for use as an end mill on milling machines of both the vertical and horizontal type. However, it also finds application in other machines such as boring mills and die-sinking machines.

The tool 10, which has a generally cylindrical body, is provided with a shank 12 having a flat 14 for securement of the tool to the tool-holding mechanism of a cutting machine. The tool is adapted to be rotated and fed axially into a metal body whereby the cutting end 16 will perform the initial cutting action. The tool is then moved sideways whereby the helical cutting teeth 20 will perform the cutting action.

Figure 3:
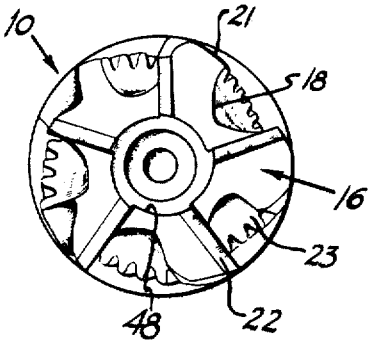
FIGURE 3 is an end view of the FIGURE 1 cutting tool.

The cutting portion of the tool is provided with a plurality of parallel helical flutes 18 which define the plurality of parallel helical cutting teeth 20. As is conventional, the flutes are formed as a right-hand helix. The teeth 20 and flutes 18 are formed according to conventional practice with respect to the radius at the bottom of the flutes, depth of flutes, width of flutes, clearance angle, number of flutes, and degree of spiral of flutes. As will be noted in FIGURE 3 the cutting end 16 is ground at 22 and 23 to give the desired cutting edge. As viewed in FIGURE 3, the tool is adapted to be rotated counterclockwise to perform the cutting action.

Longitudinally spaced chip-breaking grooves 24 are provided in each of the teeth 20. The grooves 24 are formed during the fabrication of the tool before the tool is hardened. The grooves 24 form a pattern which is a continuous helical spiral around the circumference of the tool body. This helical spiral is of the opposite hand to that of the flutes 18. Thus, the grooves 24 form a left-handed helix. The spiral is also of shorter lead than that of the flutes.

As will be noted, a tooth portion 26 having a cutting edge 34 is defined between each pair of adjacent grooves 24. The portions 26 are formed in a shape which assists in the chip-breaking action to provide the desired operating characteristics of the tool.

Figure 4:
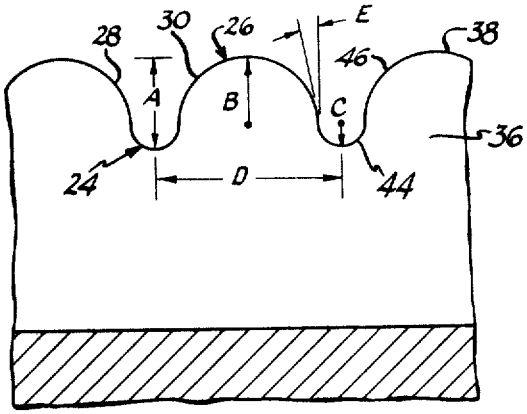
FIGURE 4 is a sectional view taken substantially along the line 4—4 of FIGURE 2 looking in the direction of the arrows.

Referring to FIGURE 4, it will be seen that the depth of each tooth is represented by the letter A, the radius of the crest of each tooth is represented by the letter B, the radius at the bottom of the grooves 24 is represented by the letter C, the center to center distance between the root of adjacent teeth is represented by the letter D, and the angle blending the crest with the bottom of the grooves is represented by the letter E. It has been found that for preferred results, these dimensions are preferably in the relationship as shown in the following table of exemplary tool sizes, the dimensions being given in inches:

| Diameter of Body | A Depth of Tooth | B Radius Crest of Tooth | C Radius Bottom of Tooth | D Center to Center Root of Teeth | E Angle Blending With Crest and Root Radii, degrees |
|---|---|---|---|---|---|
| ½ | .070 | .070 | .040 | .170 | 25 |
| ⅝ | .075 | .075 | .040 | .170 | 25 |
| ¾ | .078 | .078 | .040 | .170 | 25 |
| ⅞ | .078 | .078 | .040 | .170 | 25 |
| 1 | .080 | .080 | .040 | .200 | 25 |
| 1⅛ | .085 | .085 | .040 | .200 | 25 |
| 1¼ | .093 | .093 | .090 | .220 | 25 |
| 1½ | .105 | .105 | .100 | .250 | 25 |
| 2 | .130 | .130 | .120 | .300 | 25 |
| 2½ | .155 | .155 | .140 | .350 | 25 |

It will be additionally noted that each tooth portion 26 has curved S-shaped side walls 28, 30 formed by the grooves 24. The side walls 28, 30 define a tooth portion which is thicker at the base 36 that at the crest 38. This results from the fact that the grooves 24 are narrower at their bottoms 44 than at their top portions 46. This relationship provides a groove configuration which effectively captures the chips as they are produced and turns each chip in a desired curvature to cause uniform breakage of the chips into uniform sizes.

In manufacturing the tool 10, cylindrical steel stock is first cut to the desired tool length. The flutted end of the tool is then drilled and countersunk as at 48 to permit holding of the tool for further operations. The grooves 24 are then provided in the outer periphery of the tool in a continuous fashion by means of forming tools. The depth of this groove is approximately one-third of the ultimate depth of the flutes 18. The flutes 18 are then machined into the stock and form-relieved by providing flats 21 extending downwardly and rearwardly from the cutting edges 34 to provide clearance. The flat 14 may be machined into the shank 12 at this time. The tool is then subjected to heat treatment to provide the desired hardness and toughness for cutting metal. The shank 12 is then rough and finish ground to the desired tolerance. The cutting edges 34 and bottom of flutes 18 are also finished ground and the end 16 is sharpened for use.

The resultant tool has been found in practice to be capable of removing metal stock at a rate as much as five times that of conventional cutting tools. This is accomplished with very little machine vibration and relatively low tool temperatures. The present construction has the advantage of rapid dissipation of heat to maintain such low temperatures. The reduction of tool chatter and machine vibration results in reduced cutting machine failure which saves, in addition to the cost of maintenance, the expense of having the machine remain idle during repairs.

Having thus described my invention, I claim:

1. A rotary cutting tool comprising a generally cylindrical body, said body having a plurality of parallel helical flutes in its outer periphery forming a plurality of parallel helical cutting teeth, the body diameter ranging from a size of one-half inch to two and one-half inches, [the depth of the flutes ranging from .070 to .155 inch,] said [flute depths] *flutes having a depth* increasing in proportion to increase in body diameter, said body having a helical groove in its outer periphery which extends to a depth *ranging from .070 to .155 inch, said helical flute depth being substantially three times the depth of said helical groove* [substantially one-third the depth of the helical flutes]; said helical groove being of the opposite hand and of shorter lead than the helical flutes; said helical groove forming a plurality of longitudinally spaced chip-breaking grooves in each of the helical teeth; each of the tooth portions between a pair of adjacent chip-breaking grooves having substantially symmetrical S-shaped curved side walls formed by the chip-breaking grooves; said side walls defining a tooth portion which is thicker at the base than at the crest.

References Cited

The following references, cited by the Examiner, are of record in the patented file of this patent or the original patent.

UNITED STATES PATENTS

| | | | |
|---|---|---|---|
| 1,307,525 | 6/1919 | Trebert | 29—103 X |
| 2,113,554 | 4/1938 | Johnson | 29—103 X |
| 2,855,657 | 10/1958 | Erhardt | 29—103 X |

FOREIGN PATENTS

| | | |
|---|---|---|
| 771,631 | 7/1934 | France. |
| 1,230,614 | 4/1960 | France. |
| 8,725 | 12/1902 | Great Britain. |
| 319,309 | 2/1957 | Switzerland. |

OTHER REFERENCES

Article: Hydraspeed Heavy-duty Milling Cutters, from Machinery (British trade magazine), vol. 94 of March 25, 1959, pages 670 and 671, received in the Office Apr. 6, 1959.

HARRISON L. HINSON, *Primary Examiner.*

UNITED STATES PATENT OFFICE

CERTIFICATE OF CORRECTION

Reissue No. 26,544

March 11, 1969

Edwin C. Castor, Sr.

It is certified that error appears in the above identified patent and that said Letters Patent are hereby corrected as shown below:

In the grant (only), lines 1 and 15, "Edward C. Castor, Sr.", each occurrence, should read -- Edwin C. Castor, Sr. --.

Signed and sealed this 14th day of April 1970.

(SEAL)
Attest:

Edward M. Fletcher, Jr.
Attesting Officer

WILLIAM E. SCHUYLER, JR.
Commissioner of Patents